April 22, 1952         E. J. SULLIVAN         2,593,810
MEANS FOR ILLUMINATING THE DIAL OF A MANUALLY
SET AUTOMATIC TRANSMISSION
Filed Sept. 29, 1949
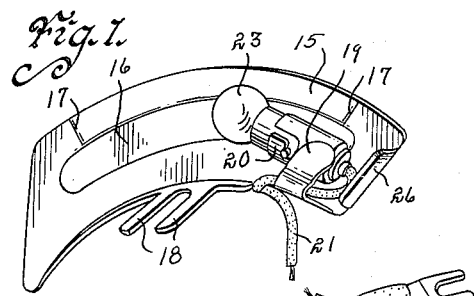
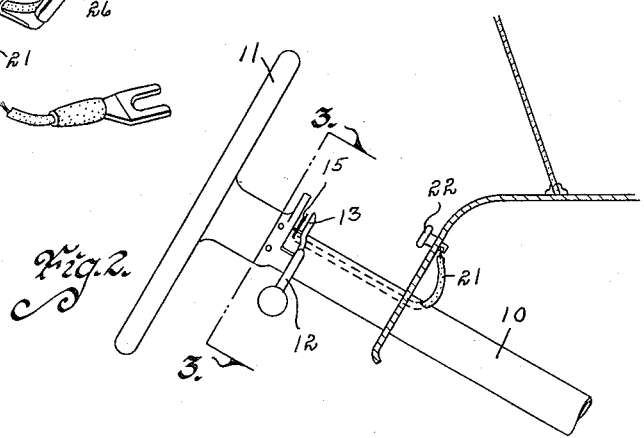
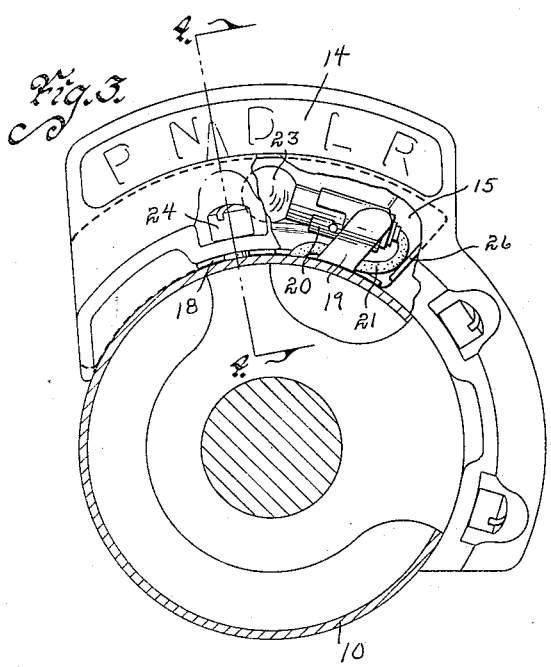
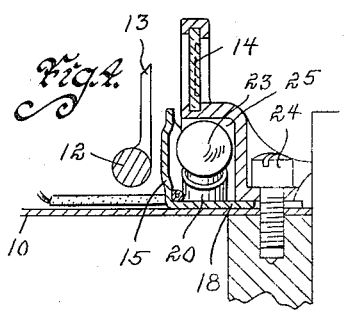
Witness
Edward P. Selby
Inventor
Edward J. Sullivan
by M. Talbert Dick
Attorney Patented Apr. 22, 1952

2,593,810

UNITED STATES PATENT OFFICE 2,593,810

MEANS FOR ILLUMINATING THE DIAL OF A MANUALLY SET AUTOMATIC TRANSMISSION

Edward J. Sullivan, Des Moines, Iowa

Application September 29, 1949, Serial No. 118,505

2 Claims. (Cl. 116—129)

This invention relates to a means for illuminating the dial of manually set automatic transmission of automotive vehicles so that the operator may be able to observe and read the indicia on the dial during the hours of darkness.

Certain automatic transmissions do have internal lighting means as standard equipment. However, in the "Dynaflow" transmission used on "Buick" automobiles the control dial is not illuminated. As is well known, the pointer has only to travel a fraction of an inch to change from low gear to reverse gear. When the operator is in darkness, it is most difficult to adjust the pointer to the correct drive.

Therefore, the principal object of my invention is to provide an attachable light means for Buick automobiles and the like that will illuminate the transmission control dial.

A further object of this invention is to provide a light of this class that may be easily and quickly attached to vehicles already on the market.

A still further object of my invention is to provide a light for transmission control dials that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is an inside perspective view of my device ready for installation.

Fig. 2 is a side view of the steering assembly of a vehicle with my device installed.

Fig. 3 is an enlarged cross-sectional view taken on line 3—3 of Fig. 2.

Fig. 4 is an enlarged longitudinal sectional view of the installed device taken on line 4—4 of Fig. 3.

In the drawings I use the numeral 10 to designate the steering post of an automotive vehicle having thereon the steering wheel 11, the manually set gear lever 12, its pointer 13 and the transmission indicator dial 14. It is to such a structure that I install my device and which I will now describe in detail. The numeral 15 designates a reflector shield bracket having a curved length to conform with the general curvature of the dial 14, as shown by dotted lines in Fig. 3. The numeral 16 designates an elongated longitudinal depression on the inner side of the shield. Near each end of the shield is an inwardly extending shoulder 17 so that the center top of the shield above the depression 16 will be off-set forwardly to direct and permit light to reach the forward side of the transparent or translucent dial 14. On the central lower edge of the shield is a forked portion 18 extending rearwardly and at substantially a right angle to the height of the shield proper. The numeral 19 designates a light socket holding tongue on the right lower edge of the shield. This tongue is bent upwardly and curved to detachably embrace a lamp socket 20 on the inner or rear side of the shield, as shown in Fig. 1. The numeral 21 designates an electric lead wire extending from the lamp socket to the switch 22 of the vehicle, as shown in Fig. 2. By this arrangement the lamp socket will be in communication with a source of electrical energy when the lights of the vehicle are turned on. The numeral 23 designates a small incandescent light bulb in the socket 20 and adjacent the inner rear side of the shield. To install my device it is merely necessary to loosen the top cap screw 24 of the steering post collar and slip the forked portion 18 under the collar and straddling the cap screw, after which the same is retightened and the lead wire connected to the light switch of the vehicle. When in place the incandescent light bulb will be located in the recess 25 under the transmission dial, and the central top of the shield reflector will be slightly spaced apart from the frame portion of the dial assembly, as shown in Fig. 4. While the source of light is under the dial proper, it will contact the inner face of the shield which will direct it upwardly and onto the forward side of the dial. This light will therefore be effective between the pointer 13 and the control indicator dial. These dials may have different indicia thereon, but usually have "P," "N," "D," "L," and "R."

With my device installed, the operator can easily read the indicia on the dial under poor light conditions.

A lip closing end 26 may be formed on the right end of the shield, as shown in Fig. 1. The reflector shield comprising the portions 15, 18 19 and 26 may be stamped and formed from one single sheet of metal.

Some changes may be made in the construction and arrangement of my means for illuminating the dial of a manually set automatic transmission without departing from the real spirit and purpose of my invention, and it is my intention to cover by my claims, any modified forms of structure or use of mechanical equivalents which may be reasonably included within their scope.

I claim:

1. In combination with a normally naturally lighted position indicating means for the manually moveable control lever of an automatic transmission, said indicating means having a fixed position dial and a pointer secured to the manually moveable control lever; said dial and said pointer in a spaced relation with respect to each other and said dial having a depression formed in its side nearer said pointer, an illuminating means comprising, an electrical illuminating unit secured in the depression in said dial, a means for connecting said electrical illuminating unit to a source of electrical energy at times, and a shield disposed across the opening of and spaced apart from the depression in said dial to direct rays from said electrical illuminating unit upwardly between said pointer and said dial to illuminate them both so that the position of the control lever may be known by visual reference to the relative position of said pointer to said dial though insufficient natural sunlight be available to make such a visual reference possible.

2. In a light for an automatic transmission control position indicator secured by a cap screw, a sheet of light reflecting material cut in a curved shape, a depression substantially following the configuration of the sheet of light reflecting material, a tongue formed integrally with the lower edge of said sheet of light reflecting material and bent outwardly then upwardly and with its free end terminating across from one end of said depression, a closing lip formed integrally with one end of said sheet of light reflecting material and extending at right angles therefrom in the same direction as said tongue is bent initially, a forked portion formed integrally with the lower edge of said sheet of light reflecting material at a point spaced apart from the point where said tongue is formed; said forked portion extending at substantially right angles to said sheet of light reflecting material in the same direction as said closing lip, an incandescent light socket with a bulb therein frictionally secured between said tongue and said sheet of light reflecting material, and a means for selectively connecting and disconnecting said incandescent light socket to a source of electrical energy; said forked portion adapted to extend on both sides and under the head of an automatic transmission control position indicator securing cap screw for securing said sheet of light reflecting material below an automatic transmission control position indicator.

EDWARD J. SULLIVAN.

REFERENCES CITED

The following references are of record in the file of this patent:

UNITED STATES PATENTS

| Number | Name | Date |
| --- | --- | --- |
| 1,999,429 | Tibbetts | Apr. 30, 1935 |
| 2,144,376 | Johnson | Jan. 17, 1939 |
| 2,223,819 | Curtiss et al. | Dec. 3, 1940 |
| 2,309,805 | Tiffany | Feb. 2, 1943 |
| 2,341,481 | Smith | Feb. 8, 1944 |

FOREIGN PATENTS

| Number | Country | Date |
| --- | --- | --- |
| 419,305 | Great Britain | Nov. 9, 1934 |